United States Patent [19]

Daniel-Ivad et al.

[11] Patent Number: 5,626,988
[45] Date of Patent: May 6, 1997

[54] SEALED RECHARGEABLE CELLS CONTAINING MERCURY-FREE ZINC ANODES, AND A METHOD OF MANUFACTURE

[75] Inventors: Josef Daniel-Ivad, Richmond Hill; R. James Book; Klaus Tomantschger, both of Mississauga, all of Canada

[73] Assignee: Battery Technologies Inc., Richmond Hill, Canada

[21] Appl. No.: 239,059

[22] Filed: May 6, 1994

[51] Int. Cl.$^6$ .................................................. H01M 4/42
[52] U.S. Cl. ........................... 429/229; 429/231; 429/224; 429/206; 429/198; 429/249; 429/142; 429/144; 429/145; 429/129; 429/247
[58] Field of Search ........................ 429/229, 231, 429/206, 198, 249, 142, 144, 145, 129, 247, 224

[56] References Cited

U.S. PATENT DOCUMENTS

| | | | |
|---|---|---|---|
| 2,971,044 | 2/1961 | Zimmerman et al. | 136/161 |
| 3,642,539 | 2/1972 | Kawakami | 136/30 |
| 3,653,965 | 4/1972 | Lee | 136/30 |
| 3,847,669 | 11/1974 | Paterniti | 136/30 |
| 4,084,047 | 4/1978 | Himy et al. | 429/206 |
| 4,144,382 | 3/1979 | Takeda et al. | 429/91 |
| 4,332,870 | 6/1982 | Parsen et al. | 429/206 |
| 4,350,745 | 9/1982 | Parsen et al. | 429/57 |
| 4,376,810 | 3/1983 | Takeda et al. | 429/90 |
| 4,500,614 | 2/1985 | Nagamine et al. | 429/206 |
| 4,548,642 | 10/1985 | Glaeser | 75/0.5 B |
| 4,585,716 | 4/1986 | Chalilpoyil et al. | 429/206 |
| 4,606,984 | 8/1986 | Vignaud | 429/212 |
| 4,735,876 | 4/1988 | Miura et al. | 429/206 |
| 4,777,100 | 10/1988 | Chalilpoyil et al. | 429/59 |
| 4,812,374 | 3/1989 | Kagawa et al. | 429/50 |
| 4,840,644 | 6/1989 | Chalilpoyil et al. | 29/623.1 |
| 4,857,424 | 8/1989 | Larsen et al. | 429/206 |
| 4,861,688 | 8/1989 | Miura et al. | 429/206 |
| 4,925,747 | 5/1990 | Kordesch et al. | 429/59 |
| 4,942,101 | 7/1990 | Audebert et al. | 429/165 |
| 4,992,343 | 2/1991 | Nardi | 429/57 |
| 5,034,291 | 7/1991 | Jacus | 429/229 |
| 5,082,622 | 1/1992 | Meeus et al. | 420/514 |
| 5,108,494 | 4/1992 | Uemura et al. | 75/347 |
| 5,128,222 | 7/1992 | Yoshizawa et al. | 429/190 |
| 5,139,900 | 8/1992 | Tada et al. | 429/206 |
| 5,162,169 | 11/1992 | Tomantschger et al. | 429/59 |
| 5,168,018 | 12/1992 | Yoshizawa et al. | 429/206 |
| 5,188,869 | 2/1993 | Getz et al. | 427/242 |
| 5,198,315 | 3/1993 | Tada et al. | 429/209 |
| 5,272,020 | 12/1993 | Flack | 429/229 |
| 5,283,139 | 2/1994 | Newman et al. | 429/224 |
| 5,296,267 | 3/1994 | Tada et al. | 427/216 |
| 5,300,371 | 4/1994 | Tomantschger et al. | 429/60 |
| 5,340,666 | 8/1994 | Tomantschger et al. | 429/59 |
| 5,364,715 | 11/1994 | Getz et al. | 429/229 |
| 5,401,590 | 3/1995 | Chalilpoyil et al. | 429/229 |
| 5,424,145 | 6/1995 | Tomantschger et al. | 429/229 |

FOREIGN PATENT DOCUMENTS

| | | |
|---|---|---|
| 894124 | 1/1982 | Belgium . |
| 983102 | 2/1976 | Canada . |
| 1267189 | 3/1990 | Canada . |
| 1271217 | 7/1990 | Canada . |
| 2046148 | 2/1992 | Canada . |
| 2105952 | 6/1994 | Canada . |
| 205783 | 12/1986 | European Pat. Off. . |
| 474382 | 8/1991 | European Pat. Off. . |
| 457354 | 11/1991 | European Pat. Off. . |
| 503288 | 9/1992 | European Pat. Off. . |
| 582293 | 2/1994 | European Pat. Off. . |
| 633620 | 11/1995 | European Pat. Off. . |
| 1086309 | 1/1961 | Germany . |

(List continued on next page.)

*Primary Examiner*—Bruce F. Bell
*Attorney, Agent, or Firm*—Bereskin & Parr

[57] ABSTRACT

The zinc active powder for a mercury-free rechargeable electrochemical cell is coated with a surfactant, and separately with an aqueous solution of indium sulphate. Without any subsequent filtering, washing or drying, the powder is assembled into an electrochemical cell. The cell can include a hydrogen recombination catalyst in contact with the electrochemically active material of the cathode.

45 Claims, 1 Drawing Sheet

FOREIGN PATENT DOCUMENTS

| | | |
|---|---|---|
| 2213347 | 10/1972 | Germany . |
| 2246753 | 4/1973 | Germany . |
| 73008415 | 3/1973 | Japan . |
| 7327098 | 8/1973 | Japan . |
| 50-098636 | 3/1975 | Japan . |
| 51-32363 | 3/1976 | Japan . |
| 55-113263 | 2/1979 | Japan . |
| 58-137964 | 2/1982 | Japan . |
| 58-163158 | 3/1982 | Japan . |
| 58-163160 | 3/1982 | Japan . |
| 58-218762 | 6/1982 | Japan . |
| 59071265 | 10/1982 | Japan . |
| 59073846 | 10/1982 | Japan . |
| 59071259 | 10/1982 | Japan . |
| 59139558 | 11/1982 | Japan . |
| 59094371 | 11/1982 | Japan . |
| 59-163760 | 3/1983 | Japan . |
| 60014758 | 7/1983 | Japan . |
| 60097551 | 10/1983 | Japan . |
| 61082670 | 9/1984 | Japan . |
| 61082669 | 9/1984 | Japan . |
| 61109256 | 10/1984 | Japan . |
| 61121263 | 11/1984 | Japan . |
| 61131366 | 11/1984 | Japan . |
| 61116755 | 11/1984 | Japan . |
| 60-032249 | 2/1985 | Japan . |
| 61203564 | 3/1985 | Japan . |
| 61-290653 | 6/1985 | Japan . |
| 61-290651 | 6/1985 | Japan . |
| 62040162 | 8/1985 | Japan . |
| 62040160 | 8/1985 | Japan . |
| 62051160 | 8/1985 | Japan . |
| 62040157 | 8/1985 | Japan . |
| 62061272 | 9/1985 | Japan . |
| 62123656 | 11/1985 | Japan . |
| 62-176053 | 1/1986 | Japan . |
| 63037568 | 7/1986 | Japan . |
| 61-267266 | 11/1986 | Japan . |
| 63-244559 | 3/1987 | Japan . |
| 3152871 | 7/1987 | Japan . |
| 64054666 | 8/1987 | Japan . |
| 1105468 | 10/1987 | Japan . |
| 1105466 | 10/1987 | Japan . |
| 1200566 | 10/1988 | Japan . |
| 2174066 | 12/1988 | Japan . |
| 2213050 | 2/1989 | Japan . |
| 2304866 | 5/1989 | Japan . |
| 2304868 | 5/1989 | Japan . |
| 2079367 | 7/1989 | Japan . |
| 2079368 | 7/1989 | Japan . |
| 3046760 | 7/1989 | Japan . |
| 3077274 | 8/1989 | Japan . |
| 2194103 | 12/1989 | Japan . |
| 4095345 | 8/1990 | Japan . |
| 4138667 | 9/1990 | Japan . |
| 4121961 | 9/1990 | Japan . |
| 4366550 | 6/1991 | Japan . |
| 3133056 | 6/1991 | Japan . |
| 3280356 | 12/1991 | Japan . |
| 4206356 | 7/1992 | Japan . |
| 465682 | 3/1975 | U.S.S.R. . |
| 756526 | 8/1980 | U.S.S.R. . |

SEALED RECHARGEABLE CELLS CONTAINING MERCURY-FREE ZINC ANODES, AND A METHOD OF MANUFACTURE

FIELD OF THE INVENTION

This invention relates to a sealed rechargeable cell containing mercury-free zinc anodes, to an anode therefor, and to a method of manufacture which includes treating a zinc or zinc alloy powder to coat the powder with indium sulphate. It more particularly is concerned with a rechargeable cell, in which zinc powder has been treated to coat the powder with both an organic surfactant and with indium.

BACKGROUND OF THE INVENTION

Rechargeable galvanic cells, with which this invention is concerned comprise a cathode, a zinc anode, a separator having at least one layer of a semipermeable membrane and an aqueous alkaline electrolyte, such as an aqueous solution of potassium hydroxide. The cathode may comprise manganese dioxide, bismuth modified manganese oxides, silver oxide, nickel oxyhydroxides or an air electrode. Graphite or carbon black is admixed to the cathode active materials to impart electronic conductivity, while potassium hydroxide is admixed to provide the necessary ionic conductivity to the cathode. The zinc anode mixture, will include zinc as one of the main constituents, and will also include electrolyte and other constituents in known manner. These cells display superior electrical performance, in particular at high discharge rates or at low temperatures, and are widely used in many applications.

In light of environmental concerns surrounding the disposal of batteries, toxic materials utilized as additives in manganese dioxide/zinc cells such as mercury are being drastically reduced or eliminated from the cell chemistry. A problem common to zinc electrodes is that zinc is corroded by most aqueous electrolytes resulting in generation of hydrogen gas. Traditionally, zinc powder has been amalgamated with mercury to elevate the hydrogen overpotential thereby suppressing gassing and leakage problems. Mercury additions have also provided an additional benefit in constituting a conductive additive resulting in superior electrical performance of galvanic cells utilizing amalgamated zinc as negative electrode materials, in particular at high discharge rates, at low temperatures and under conditions where the cells are exposed to shock and vibration.

Due to these increasing environmental concerns it has become desirable to reduce or eliminate the amount of mercury used in galvanic cells. Generally, in primary cells, methods have focused on the use of selected metals, and the use of organic corrosion inhibitors, to prevent hydrogen generation within the galvanic cell. In rechargeable cells, the detrimental growth of dendrites caused by the recharge processes must be prevented in addition to reducing the hydrogen evolved by corrosion and during recharge.

The employment of low surface tension metals such as lead, indium, gallium, thallium, bismuth, calcium and aluminium is disclosed in the technical literature. The metals are added as minor alloying agents. Substantial prior art exists describing alloys of zinc with indium with and without mercury and other alloying agents. In the case of rechargeable cells containing a zinc negative electrode the cycle life benefits from employing indium or its compounds as dendrite preventers are known. This has been documented in the patent and other literature since around 1960. Similarly, the use of nonionic and anionic surfactants as dendrite preventers is also described from around the same time.

Similarly, the known art since around 1960 addresses the problem of the surface coating of the zinc powders with appropriate metals or their compounds, prior to processing the negative electrode. However, the techniques were often complicated and frequently included filtering, washing and drying steps. The present inventors have discovered that the washing and drying steps alter the surface coating on the zinc powder, containing the dendrite and corrosion preventers, so that they become less effective.

Adding indium during the negative electrode assembly procedure either in form of indium compounds or alternatively dissolving appropriate metal compounds in the cell's electrolyte is also described in the prior art.

The use of organic surfactants and indium for prevention of zinc dendrite growth and hydrogen evolution has been known for over thirty years. A number of commercially available surfactants can raise the hydrogen overpotential of metallic zinc or zinc alloys which can optionally contain a surface coating of a metal. It has also been reported that a number of effective organic surfactants when used in rechargeable galvanic element containing a zinc negative electrode provide an additional benefit in terms of the cell capacity and cycle life.

H.M. Kiel in DE 1,086,309 (1961) is one of the oldest proposals and introduces art relating to zinc-indium alloys, as well as indium ions in the electrolyte. Kiel describes a primary or secondary galvanic cell with a zinc electrode in an acidic, neutral or alkaline electrolyte, characterized by the addition of indium compounds to the electrolyte or alloying indium with high purity zinc. It describes in great detail the self discharge of zinc active material in acidic, neutral and alkaline electrolytes resulting in the liberation of hydrogen gas, cell leakage and the resulting limited shelf life of the respective cells. In the claims the patent describes indium additions to a galvanic cell containing a zinc negative electrode, either in the form of a zinc-indium alloy or, alternatively addition of In compounds to the electrolyte, in which the zinc has a purity of 99.99%, and the use of an alkaline, acidic or neutral electrolyte.

A. Kawakami in U.S. Pat. No. 3,642,539 (1972) adds an indium compound to the cell bottom, the separator or the electrolyte, to prevent dendrite or spongy zinc in rechargeable zinc air cells. H. Ikeda in Japanese published application J6032363 (1976) treats zinc powder in an acidic indium chloride solution and then filters, washes and dries the zinc powder.

Canadian patent No. 1,267,189 to Winger describes a primary or single use galvanic cell having a manganese dioxide cathode, an alkaline electrolyte solution and a zinc anode containing mercury. Winger states that the amount of mercury used in the cells can be reduced to between about 0.04% and about 3.0 weight percent based on the weight of the zinc by incorporating both a compound containing polyethylene oxide linkages and indium in the cell. However, Winger states that the use of mercury cannot be completely eliminated, as if the amount of mercury is below 0.04% by weight, storage stability is adversely affected even with the addition of both a compound having polyethylene oxide linkages and indium.

U.S. Pat. No. 5,198,315 (K. Tada) apparently discloses a primary zinc alkaline cell which uses non-amalgamated zinc alloy powder as an anode active substance. The zinc alloy powder is surface coated with indium and has a bulk specific gravity adjusted to range from 2.90 to 3.50 grams per cubic centimetre. Two methods of coating the zinc alloy with indium particles are described. The first method involves charging a heated mixer with a predetermined amount of zinc alloy powder and a predetermined amount of indium particles and nitrogen gas, and mixing at 180° C. for one hour. The second method involves mixing a predetermined amount of zinc alloy powder with a predetermined amount of an indium salt, such as indium sulphate in water and stirring for 30 minutes. The resulting zinc alloy powder was filtered, washed with purified water, had the water adhering on the zinc alloy powder replaced by acetone and then dried at 45° C. for one day.

U.S. Pat. No. 5,168,018 to Yoshizawa discloses a method of manufacturing a mercury free zinc alkaline battery in which the anode comprises zinc alloy powder as an active material and contains an indium hydroxide powder dispersed therein and an organic corrosion inhibitor, such as perfluoroalkyl polyethylene oxide surfactant. The indium hydroxide powder used is preferably synthesized by neutralizing an aqueous solution of indium chloride or indium sulphate. It is indicated that indium chloride is preferred, as indium hydroxide powder based on indium chloride has a better corrosion resistance than when indium sulphate is used. When the indium hydroxide powder is dispersed with the zinc alloy powder into electrolyte, part of the indium hydroxide is electrodeposited onto the surface of the zinc alloy, and part is retained in a solid form in the electrolyte, for electrodeposition onto fresh zinc surfaces exposed during discharging. Again, Yoshizawa's disclosure relates to single use, primary cells.

More recently, there have been a number of proposals for alkaline cell systems configured for use as secondary or rechargeable cells.

K. Kordesch et. al. in U.S. Pat. No. 4,925,747 (1990) describes a primary or rechargeable electrochemical cell such as an alkaline manganese dioxide-zinc primary or secondary cell in which hydrogen is recombined between 5 and 15 psig up to the relief pressure of the cell by incorporating an auxiliary electrode or electrode material and a catalyst for the absorption of hydrogen in presence of electrolyte and in intimate electrical contact with the cathode. Auxiliary electrodes described are noble metal porous gas diffusion electrodes placed on the top of the cathode which oxidize hydrogen in presence of electrolyte and the electrocatalyst to water. Noble or non noble metal catalysts admixed into part of the entire cathode were found to be useful in recombining hydrogen gas as well. In the case of silver catalyst the amount of silver required was relatively high (3–30%$Ag_2O$). It also mentions nickel and nickel alloys with lanthanum or titanium as possible catalysts.

K. Tomantschger et. al. in U.S. Pat. No. 5,162,169 (1992) demonstrated hydrogen recombination utilizing only small amounts of silver, silver compounds and noble metals in conjunction with $MnO_2$. Again, as in U.S. Pat. No. 4,925,747 intimate electronic and ionic contact is maintained between the hydrogen recombination catalyst and the cathode. In fact, it was demonstrated that the reduction of the silver content to or below 0.1% of the cathode (125 ppm of the Ag/$MnO_2$ mixture) still resulted in appreciable hydrogen recombination rates. The recombination does not necessarily require any overpressure to proceed. The hydrogen recombination catalyst represents between 0.1 and 30% of the weight of the catalyst/$MnO_2$ mixture and may be supported on a porous substrate such as carbon or graphite. The auxiliary electrode material can be included in part or in the entire cathode.

F. Parsen in U.S. Pat. No. 4,350,745 (1982) describes an agent for absorbing hydrogen gas made of $MnO_2$ and non noble metal catalysts such as nickel, cobalt or iron. The recombining article is preferably formed into small agglomerates which can be added to the cathode and/or electrolyte of the cell or combined with the material to be formed into the cathode or anode preferably in the form of small capsules (e.g. microballoons). Oxides of manganese or lead form the absorbent and a powdered metal selected from the group of nickel, cobalt and iron form the catalyst.

SUMMARY OF THE INVENTION

It is therefore desirable to provide a process for manufacturing a negative zinc electrode, for use with an electrolyte, such as aqueous potassium hydroxide, in rechargeable galvanic cells, which negative electrode exhibits superior performance characteristics, as compared to known cells of this type.

It is also desirable to provide a zinc electrode with reduced hydrogen gassing characteristics, for use in a rechargeable galvanic cell containing an aqueous potassium hydroxide electrolyte.

It is further desirable to provide a zinc electrode which has a reduced tendency to form dendrites on charge with improved life cycle characteristics, for use in a rechargeable galvanic cell containing aqueous potassium hydroxide electrolyte.

According to the present invention, there is provided a mercury-free rechargeable cell comprising: a cathode; an electrolyte; an anode; and a separator between the anode and the cathode, wherein the anode comprises a zinc active powder that has been coated with a film of a surfactant and a film of an aqueous solution of indium sulphate and subsequently assembled into the electrochemical cell, without treatment to remove sulphate ions.

Preferably, the electrolyte comprises an aqueous solution of potassium hydroxide, optionally including potassium zincate, and/or potassium fluoride. Preferably, the active material of the cathode comprises at least one of manganese dioxide and bismuth modified manganese oxide.

Advantageously, the cathode active materials include a hydrogen recombination catalyst. The catalyst can be provided as a coating on the cathode exterior.

As a separate aspect of the present invention, there is provided a mercury-free rechargeable cell capable of numerous charge and discharge cycles, the cell comprising: an anode including zinc as an electrochemically active material; an electrolyte; a cathode; and a coating including the hydrogen recombination catalyst, provided on an external surface of the cathode.

The surfactant is preferably selected from the group comprising octylphenoxypolyethoxyethanols, polypropylene glycols and polyethyleneglycols. More preferably, the surfactant is polypropylene glycol having a molecular weight in the range 400–800.

As a further aspect of the present invention, there is provided a mercury-free rechargeable cell comprising: an anode; a cathode having an active powder including oxides of manganese; a separator including at least one semipermeable membrane layer; an electrolyte solution in the separator, the cathode and the anode, and filling pores thereof, wherein the anode mixture comprises a zinc active powder, the electrolyte, an indium additive and a nonionic surfactant of a molecular weight in the range of 300 to 1500 selected from the group consisting of polypropylene glycols, octylphenoxypolyethoxyethanols, polyethoxyglycols.

Yet another aspect of the present invention provides a method of manufacturing a mercury-free zinc anode for use in electrochemical cell, a method comprising the steps of:

(a) optionally coating the mercury free zinc powder with a film of an organic surfactant;

(b) coating the mercury-free zinc powder with a film of an aqueous solution of indium sulphate; and (c) processing the coated zinc powder into an anode, without treatment to remove sulphate ions.

The electrolyte can comprise an aqueous solution of potassium hydroxide having a concentration in the range of about 25% to 45%. It may also include potassium zincate having a concentration in the range 0 to 12%. The electrolyte may also, or alternatively, comprise a mixture of potassium hydroxide having a concentration in the range of 4 to 6 molar, and potassium fluoride having a concentration in the range of 1.0 to 2.5 molar.

The materials of the cell can include a finely divided hydrogen recombination catalyst comprising at least one of a hydrogen storage alloy, silver, and a silver oxide which are electronically and ionically connected to the manganese oxide of the cathode. Preferably, the hydrogen recombination catalyst comprises 0.1–5% by weight of the electrochemically active material of the cathode. More preferably, the catalyst should maintain an acceptable hydrogen pressure of below 30 atmospheres.

BRIEF DESCRIPTION OF THE DRAWINGS

For a better understanding of the present invention and to show more clearly how it may be carried into effect, reference will now be made, by way of example to the drawing, which shows in FIG. 1, a sectional view of a cell according to the present invention.

DETAILED DESCRIPTION OF THE PREFERRED EMBODIMENT

Figure 1:
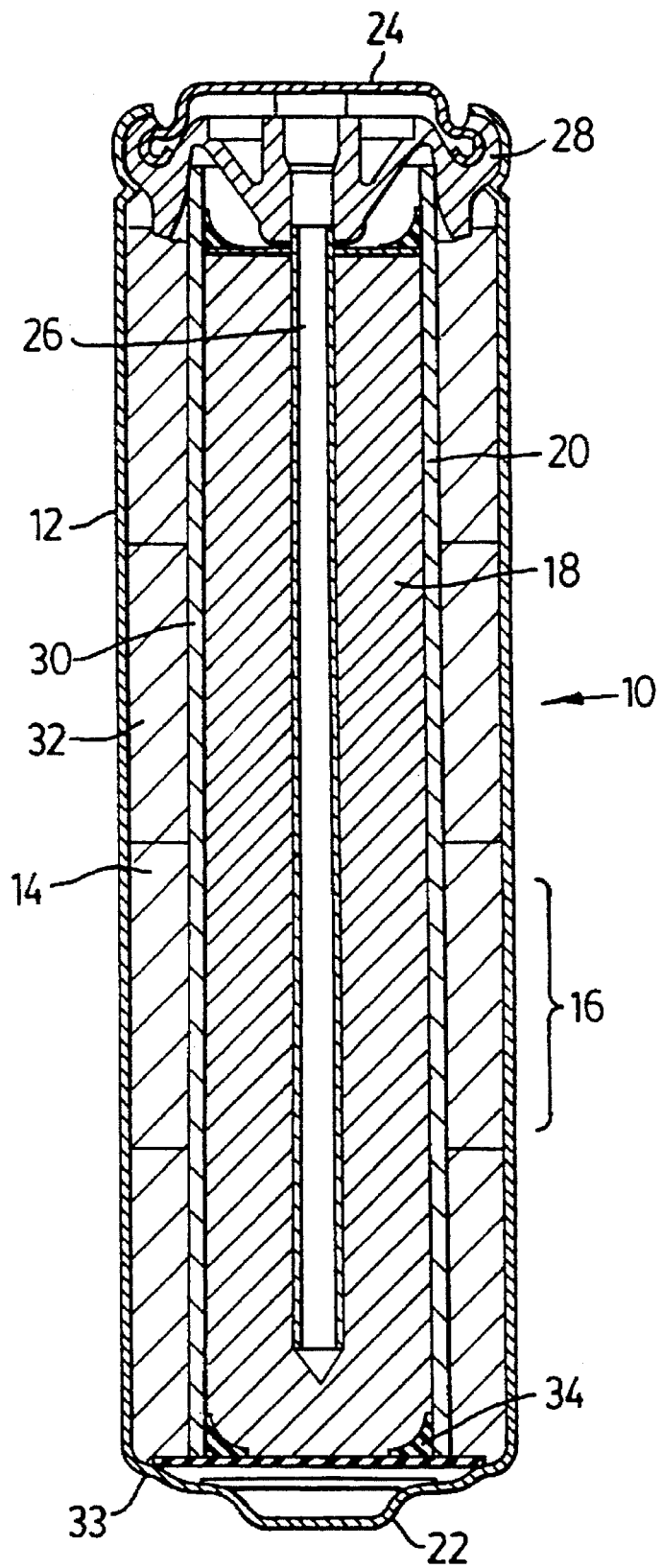

In the following description, individual components of the anode, cathode, etc are given as percentages by weight, either with respect to the whole anode, cathode etc, or with respect to a primary component, such as zinc powder in the anode.

FIG. 1 shows a cross sectional elevation view of an alkaline rechargeable cell 10. The cell comprises the following main units: a steel can 12 defining a cylindrical inner space, a cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between and in the anode and the cathode is provided by the presence of potassium hydroxide electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The separator 20 consists of two laminated layers i.e.: a first or inner layer 30 made of a fibrous sheet material wettable by the electrolyte, and a second or outer layer 32 being impermeable for small particles but retaining ionic permeability. An expedient material for the first layer 30 is Dexter paper (grade 7490 or 7498-2) or nonwoven polyamide. The difference between these two types of paper lies in their thickness. Both types of these materials can be used in primary and secondary cells to separate mechanically the anode and the cathode electrodes and to serve as an electrolyte reservoir. The macroporous structure of the inner layer 30 cannot prevent solid contamination particles from moving between the two separated spaces.

This separation is provided by the second layer 32 which has a microporous structure and preferably is an appropriate thin cellophane layer.

The two laminated layers 30 and 32 are wound together to form the separator 20.

The sealing of the bottom part of the cell can be made by using an insulator washer 33 shown in FIG. 1 which is placed to abut the bottom portion of the can 12 prior to the insertion of the cathode pellets 16. The laminated separator 20 is inserted thereafter so that its bottom edge abuts the insulation washer 33. In this case, the contact zone between the bottom of the separator 20 and the washer is sealed by the application of a controlled amount of a hot melt or a similar thermoplastic sealant like asphalt. The sealing is done by means of an appropriate heated tool which is inserted deeply in the cylindrical cavity defined by the cathode and this dispenses a predetermined amount of melt sealant to the contact zone. After solidifying the sealant will have a concave profile with small height and width as shown by 34 in FIG. 1.

It will be appreciated that the exact configuration of the separator 20 and its bottom seal is not critical to the present invention. FIG. 1 shows a bottom seal for the separator 20, which is the subject of earlier U.S. Pat. No. 5,272,020, but which is not essential for the present invention.

In accordance with the present invention, the zinc active material may comprise at least one of a metallic zinc powder, zinc alloy powder and zinc oxide powder. The metallic zinc powder preferably has purity of 99.98%, while the zinc alloy powder preferably comprises 99% zinc. Such powders are commercially available, and generally have a particle size of between 20 and 400 Tyler mesh. The metal powders may also contain lead or indium as minor alloying agents, typically from about 0.02% to about 0.08% by weight of lead and/or up to 1% by weight of indium. Up to about 20% by weight of solid zinc oxide may be incorporated into the active material of the anode. However, cells of the present invention also gave good cycle life when no solid zinc oxide was initially added to the cell.

The zinc anode used is "mercury-free", that is it contains no mercury within the limitations of conventional processing methods and the extremely small natural contents of the materials. It may contain minor, residual amounts of mercury which do not affect its properties.

The zinc active materials are first treated with a small amount of an organic surfactant or wetting agent. To be suitable, the surfactant should be stable and effective in the concentrated potassium hydroxide electrolyte. A wetting agent or surfactant is a compound which is effective in even minute concentrations. The preferred surfactants for rechargeable alkaline cells are selected from the group of nonionic and anionic surfactants having a molecular weight of from about 300 to about 1500, and more particularly are compounds containing polyethylene oxide or polypropylene oxide groups, their copolymers or mixtures thereof. Particularly suitable surfactants include polyoxypropylene compounds, polyoxyethylene compounds and mixtures and copolymers thereof.

The zinc active materials are then coated with a film of an aqueous solution of indium sulphate. The concentration of indium sulphate is selected to ensure that the coated zinc anode active materials will demonstrate the required level of dendrite prevention and hydrogen evolution. As determined, experimentally, the weight of each of the surfactant and the indium sulphate, i.e. discounting weight of water in the aqueous solutions, is preferably less than about 0.5%, and most preferably from about 0.01% to 0.25%, based on the total weight of the zinc active powder.

It has been surprisingly found that the amounts of surfactant and indium sulphate solution required to achieve a uniform coating of the zinc particles are unexpectedly low. The amounts are chosen such that no free solution remains and the zinc is free flowing after both treatments and without washing and drying.

Liquid to solid blenders are used to treat the zinc active material with the surfactant or its solution. The surfactant or its solution and the zinc active material are mixed for a sufficient time to ensure that the surfactant is uniformly distributed on the zinc particles. Then, still in the blender, a small amount of an aqueous solution of indium sulphate is added to the treated zinc active material, and blending is continued to ensure uniform distribution on the powder particles. In contrast to the prior art, there is no need for the resultant blend to be filtered, washed and dried prior to incorporation into a cell and such lengthy steps can be eliminated, so that both labour and capital are saved. If the anode is to be of the gelled type, suitable gelling agents and other additives can then be incorporated into the blend followed by adding the alkaline electrolyte. The gelled anode can then be used in known manner.

A gelled zinc anode manufactured by the method described above can be used in rechargeable alkaline manganese dioxide/zinc galvanic cells. These cells can be assembled in cylindrical, button, coin, or rectangular containers. For a gelled zinc electrode as used in rechargeable alkaline manganese dioxide/zinc cells up to 20% zinc oxide powder could be included. Zinc anodes manufactured by the method of the present invention typically contain 1.43 to 2.4 grams of treated zinc powder per $cm^3$ of gel and may contain up to 0.8 grams of solid zinc oxidepowder per $cm^3$ gel. The pores or spaces around the powdered materials are filled by gelled electrolyte, an aqueous solution of potassium hydroxide, which can include potassium zincate. It has been found that if the initial zinc content of the gel is below 1.43 grams per $cm^3$ of gel, discharge capability, energy density and shock resistance are reduced. If the zinc content is above 2.4 grams per $cm^3$ gel, there is increased polarization, poor active material utilization and poor high rate discharge capability of rechargeable cells.

In the case of rechargeable cells using pasted or flat plate electrodes, depending on whether the cell is assembled in the discharged state or charged state the zinc to zinc oxide powder ratio can vary from 10/90 (dischargued state) to 100/0 (fully charged state). The aqueous electrolyte is usually 25% to 40% potassium hydroxide solution, optionally with zinc oxide dissolved in it up to saturation. During the dissolution process the zinc oxide reacts with potassium hydroxide and water to form potassium z incate $K_2Zn(OH)_4$. The negative electrode is processed by kneading the zinc/zinc oxide powder mixture with 4% to 10% PTFE colloidal suspension, by weight of the zinc powder, and the paste is subsequently applied to at least one side of the current collector by e.g. a rolling process followed by an optional pressing step.

The separator 20 is at least partially wetted by the electrolyte and preferably contains at least one barrier layer of a semi-permeable or ion-exchange membrane. It has been known that in rechargeable cells, in particular those employing zinc with little or no mercury, shorts can develop during charge/discharge cycling. The chosen membrane should provide the function of a barrier preventing dendritic zinc shorts from occurring. Dendritic growth of zinc has been found by the inventors to be synergistically retarded by the combination of the films of indium and surfactant covering the zinc active materials and the semipermeable barrier layers. Typically, the separator 20 may contain at least two layers, an absorbent layer with wicking properties serving as an electrolyte reservoir and a barrier layer which is resistant to zinc dendrite growth. The absorbent layer may contain non-woven rayon, or polyvinyl alcohol or polyamide fibers. Suitable materials for the barrier layer include cellophane, sausage casing and acrylic acid grafted polyethylene or polypropylene. Preferably, the separator 20 comprises a laminate of the absorbent layer and the barrier layer. Alternatively, the separator 20 may contain one or more barrier layers and one or more absorbent layers. Microporous polypropylene barrier layers such as "CELGARD" have been shown to be resistant to dendrite growth.

A variety of cathode active materials can be used with the anode 18 of the present invention. The cathode active materials comprise at least one of manganese dioxide, manganese oxyhydroxide, bismuth modified manganese oxide, silver oxide, nickel oxyhydroxide or oxygen in an air electrode. A bismuth modified manganese oxide generally includes 3% to 10% bismuth compound that has been physically admixed with the active materials of the cathode. The electrolyte is generally an aqueous solution of potassium hydroxide and can include zinc oxide to form potassium zincate, and a zinc-nickel oxide cell could include potassium fluoride.

A suitable manganese oxide positive electrode for use in a rechargeable cell is described in U.S. Pat. No. 5,300,371, the contents of which are hereby incorporated by reference. Suitable active materials utilizing manganese oxides comprise e.g. electrolytically or chemically synthesized manganese dioxide containing typically over 90% of four valent manganese dioxide and minor amounts of lower valence oxides. In the case where manganese oxides are used as active material in the positive electrode typically 5% to 15%, by weight of the cathode, of graphite and carbon black are added to the electrode mixture as well as minor amounts below 1% , by weight of the cathode, of a hydrophobic lubricant such as polytetrafluoroethylene or a metal stearate and optionally a hydrogen recombination catalyst. The hydrophobic lubricant acts as a lubricant during powder processing and facilitates gas penetration into the cathode. To improve the cycling performance of the manganese oxide electrode, the addition of compounds such as barium oxide, hydroxide or sulphate, in the range of 3% to 15% by weight of the cathode is desired. Enough of a 20% to 45% potassium hydroxide solution is added to the cathode mixture to fill substantially all pores between the solid powders of the cathode.

For the purpose of hydrogen recombination typically 0.01% to 10%, by weight of the cathode of a suitable finely divided hydrogen recombination catalyst can be added to the positive electrode 14. Effective catalysts include silver, its oxides, and compounds as well as metal alloys capable of absorbing hydrogen. Hydrogen absorbing alloys are intermetallic alloys, such as $LaNi_x$ or $NiTi_y$, which when in electronic and ionic contact with the cathode active material may serve as an intermediary for the reaction of hydrogen with the metal oxide.

In the case a metal oxide active material is used, the hydrogen recombination catalyst can be as described in U.S. Pat. No. 5,162,169 (1992), the contents of which are also hereby incorporated by reference. For example, 0.01% to 5%, by weight of the cathode, of $Ag_2O$ catalyst powder is added to the positive electrode.

The present invention also provides for the formation of a thin coating containing the hydrogen recombination catalyst on the surface of the positive electrode or on a surface contacting the positive electrode such as the separator 20 or the current collector which here is the interior of steel can 12. The coating typically contains 5% to 75% (by dry weight) of the hydrogen recombination catalyst the balance being graphite, carbon and a suitable binder. The catalytically active coating may be electrically conductive. In the event that the catalytically active coating is applied to the current collector of the cell i.e. the interior of can 12, or a wire mesh, the catalytically active coating needs to be conductive. In this case the coating, in addition to promoting the hydrogen recombination within the cell, also serves to improve the internal resistance characteristics of the galvanic cell.

The coating according to the present invention does not need to be continuous and uniform. It may be applied only in locations which can be easily accessed by the hydrogen gas.

Accordingly, the interior surface of the can 12 of an alkaline cell which is in contact with the positive electrode is coated at least in part. Alternatively, or in addition, the coating may be applied to the positive electrode performs or pellets 16 e.g. by spraying or dipping. It may be applied to the inside and/or the exposed top 22 of the positive electrode moulded into the can container. Alternatively, the coating may be applied to the outside of e.g. the separator tube 20 which after insertion into the cell contacts the positive electrode 14.

After application of the coating dispersion a drying step may be incorporated which permits the evaporation of the solvent and allows the adhesion of the coating to the article it has been applied to.

Various examples will now be described. These were subject to various tests, as identified, but in all cases the default charge condition was 12 hours voltage limited taper charge to 1.65 volts.

EXAMPLE 1- BOBBIN CONFIGURATION AA (LR06) SIZE RECHARGEABLE ALKALINE CELLS

Three experimental group of AA size cells were assembled as shown in FIG. 1 and as in the following table in which percentages are by weight of the electrode mixture:

TABLE 1a

| Positive electrode | |
|---|---|
| Manganese dioxide | 79% |
| 9N Potassium hydroxide solution | 6.5% |
| Graphite, additives | 14.3% |
| Silver Oxide | 0.2% |
| Negative electrode | |
| Zinc powder (mercury-free) | 56.24% |
| Lead (minor alloying component in zinc) | 0.05% |
| Zinc oxide powder | 8.6% |
| Polypropylene glycol* | 0.05% |
| Indium sulphate* | 0.13% |
| Aqueous electrolyte containing 38% KOH + 12% $K_2Zn(OH)_4$ | 35% |

*Weight is that of surfactant or indium and does not include weight of water forming aqueous carrier solution.

The indium sulphate was provided as an aqueous solution with a concentration of 22.5% indium sulphate and a pH of between 1 and 2. It was prepared by dissolving the indium compound in deionized water. A 10% aqueous dispersion of polypropylene glycol was used for wetting.

Three different methods were used to manufacture the zinc anodes, identified as Group 1, 2 and 3 below. Groups 1 and 2 are essentially representative of prior art techniques, including filtering, washing and drying after indium treatment (Group 1) and, filtering and washing only (Group 2). Group 3 is representative of cells made according to the present invention.

The anodes of Group 1 were manufactured by tumbling the zinc active material in an excess of an aqueous solution of indium sulphate to obtain an indium coating on the zinc surface by cementation. In effect, the indium is precipitated or deposited on the zinc and an electrochemical equivalent amount of zinc goes into solution, in known manner, to form zinc sulphate. The treated zinc powder was filtered, washed repeatedly to remove zinc sulphate and then dried. The aqueous solution of the surfactant was then applied to the dry powder. The resulting zinc/indium/surfactant powder was then vacuum dried. The powder was then blended thoroughly with a gelling agent, additives and the potassium hydroxide electrolyte to form a gelled electrode.

The anodes of Group 2 were manufactured by tumbling the zinc active material with the aqueous acidic solution of indium sulphate, filtering the zinc and then the zinc sulphate was removed by washing. Without drying, the surfactant was added, followed by the gelling agent, additives and the potassium hydroxide electrolyte and the ingredients then blended together. The ingredients were again blended thoroughly, to give a gelled zinc powder anode.

The anodes of Group 3 were manufactured by adding to the zinc active material a small amount of the surfactant, as detailed in the table above. Without any intervening washing, drying or filtering, the aqueous solution of indium sulphate was then slowly sprayed through a nozzle onto the wetted zinc powder while blending the mixture. Then the gelling agent, additives and electrolyte were added and blended until a homogeneous gel was obtained.

Cells of all three groups used a brass nail current collector 26 in association with the zinc anode 18. It was determined that upon insertion of the brass nail into the gel, the surface of the nail was spontaneously coated by a layer of metallic zinc. After several discharge/recharge cycles, the zinc coating on the brass nail contained indium that had been transferred from the zinc powder coating onto the brass nail coating.

The test cells were exposed to various electrical and gassing tests, as follows:

1. twenty (20) repeated discharge/charge cycles using a 43Ω load resistor to an end of discharge voltage of 0.9 volts;
2. one (1) discharge using a 10Ω load resistor to an end of discharge voltage of 0.9 volts, followed by a 3 month charge, followed by five (5) repeated discharge/charge cycles using a 10Ω load resistor to an end of discharge voltage of 0.9 volts;
3. one (1) discharge/charge cycle using a 10Ω load resistor to an end of discharge voltage of 0.9 volts, followed by 4 weeks storage at 65C, followed by three (3) repeated discharge/charge cycles using a 10Ω load resistor to an end of discharge voltage of 0.9 volts;
4. three (3) weeks storage at 65C followed by five (5) repeated discharge/charge cycles using a 10Ω load resistor to an end of discharge voltage of 0.9 volts;
5. two (2) weeks storage at 65C followed by five (5) repeated discharge/charge cycles using a 10Ω load resistor to an end of discharge voltage of 0.9 volts;
6. two (2) weeks storage at 55C followed by twenty (20) repeated discharge/charge cycles using a 1.8Ω load resistor for 15 sec/min (photoflash simulation test) to an end of discharge voltage of 0.9 volts; and 7. two (2) weeks storage at 55C followed by 30 (thirty) repeated discharge/charge cycles using a 10Ω load to an end of discharge voltage of 0.9 volts.

New cells were used for each test, and after each test, the cells were punctured and the accumulated gas was collected.

The electrical performance of the test cells on the initial discharge, as well as the cumulative discharge capacity over the life cycle of the cells, did not vary significantly between the cells of the different groups. The gassing performance of cells of the three groups are shown in Table 1b. It is apparent from these results that a zinc anode manufactured by the method of the present invention exhibits superior gassing performance.

To determine the gassing performance, selected test cells from all groups were collected after completion of the seven electrical tests; the cells were then punctured and the released gas was collected and measured.

TABLE 1b

|  | Group 1 (Prior art) | Group 2 (Prior art) | Group 3 (Present Invention) |
| --- | --- | --- | --- |
| Indium based on the zinc weight [%] | 0.1% | 0.1% | 0.1% |
| Surfactant based on the zinc weight [%] | 0.08% | 0.08% | 0.08% |
| Maximum gas collected in a cell [ml] | 10.4 | 18.2 | 6.2 |

From these in cell gassing results it is apparent that the gel processing techniques according to the present invention results in superior inhibition of hydrogen evolution. The test results revealed that cells according to the present invention are capable of 30 deep to 300 shallow life cycles, without any shorts developing due to dendrite growth. The cells have a gassing performance which is superior to cells manufactured using the other known formulations and processing techniques.

Further it has been found quite unexpectedly that the indium sulphate coated on the metallic zinc resulted in a secondary cell with excellent cycle life and charge retention characteristics, better than previously reported when solid $In_2O_3$ or $In(OH)_3$ was present in the anode or the electrolyte. In addition, no dendrite shorting was apparent.

This is in addition to providing a technique for adding indium which is inherently simpler and which is more economical than known techniques.

It can be noted that elimination of the drying step in Group 2, as compared to Group 1, suggests that the full filtering, washing and drying sequence is necessary for good performance. To the contrary, it has been found that all these steps can be eliminated, and superior gassing results can be achieved.

Due to the elimination of the washing and drying steps, the gelled anode processing became substantially more economic. Substantial savings on labour and cost of equipment can be realized in production on a commercial scale. The distribution of the surfactant and the indium sulphate as a film of an aqueous solution onto the zinc, zinc alloy and/or zinc oxide particles becomes precise and uniform.

EXAMPLE 2

Three groups of "AA" size cells were assembled. The negative electrode was a mercury free gelled zinc electrode processed with a film forming agent i.e. a surfactant and an indium sulphate as described in Group 3 of Example 1. Various hydrogen recombination catalysts (HRC) were assessed with the cathode mix being as in Example 1 except for the silver oxide. A control group employed no catalyst. Group 1 contained 0.5% $Ag_2O$ uniformly dispersed within the positive electrode mix and group 2 contained 1.0% $Ti_2Ni$, an alloy capable of absorbing hydrogen, uniformly dispersed within the positive electrode mix.

Test cells were assembled and exposed to a variety of electrical and storage experiments. The electrical performance of all groups was very similar. The following tests were performed on all three groups:

1) thirty repeated discharge/charge cycles using a 3.9Ω load resistor to an end of discharge voltage of 0.8 Volts, followed by 3 weeks storage at 65C;

2) twenty repeated discharge/charge cycles using a 10Ω load resistor to an end of discharge voltage of 0.9 Volts, followed by 3 weeks storage at 65C;

3) 3 weeks storage at 65C followed by five discharge/charge cycles using a 10Ω load resistor to an end of discharge voltage of 0.9 Volts, and 4) one discharge using a 10Ω load resistor to an end of discharge voltage of 0.9 Volts, followed by 3 weeks storage at 65C, followed by five repeated discharge/charge cycles using a 10Ω load resistor to an end of discharge voltage of 0.9 Volts.

New, unused cells were each subject to one of the four tests. After testing, the cells were punctured, and the accumulated gas was collected.

No leakage was observed on any of the tests. The gas collected after the tests 1 to 4 as above was determined and the averages and maxima of the collected gas are listed in table 2. It is apparent that the various means of hydrogen recombination result in significantly reduced in cell gas volumes.

Table 2: Influence of various types of hydrogen recombination catalysts HRC on the gas volume of LR06 mercury free cells after a variety of electrical and high temperature storage tests.

|  | Control | Group 1 | Group 2 |
| --- | --- | --- | --- |
| Hydrogen Recombination Catalyst (HRC) | None | $Ag_2O$ | $Ti_2Ni$ |
| HRC Content in the Positive Electrode [% by weight of cathode] | 0 | 0.50 | 1.00 |
| Maximum Gas Collected in a Cell [ml] | 7.30 | 3.70 | 4.50 |
| Average Gas Collected per Cell [ml] | 3.68 | 1.58 | 1.45 |
| Gas Volume Reduction [%] | 0 | 57 | 61 |

EXAMPLE 3

Five groups of "AA" size cells were assembled. The negative electrode was a mercury free gelled zinc electrode with a film forming agent and indium sulphate processed as described in group 3 of Example 1. The positive electrode composition was as in Table 1 of Example 1. Various hydrogen recombination means were assessed. They included the control group which employed no catalyst. Group 1 contained 0.5% $Ag_2O$ uniformly dispersed within the positive electrode. Group 2 used Ag$_2$O within a coating dispersion, supplied by Acheson Colloids (Canada) that typically contains 20–25% solids in deionized water. The solids typically consist of 15–20% graphite and 2–5% polymeric binders such as polyvinylacetate. The coating was applied to the can prior to inserting the positive electrode. Group 3 contained 0.5% silver dust uniformly dispersed within the positive electrode. Group 4 used Ag$_2$O within a coating dispersion which was applied to the can prior to inserting the positive electrode. (All percentages are by weight of the cathode).

Test cells were assembled and exposed to a variety of electrical and storage experiments. The electrical performance of all groups was very similar. To determine the effect of the various means of the controlling hydrogen generations test cells were pierced after selected tests and the gas accumulated within the cells was collected. The following tests were performed on all groups prior to the determination of gas volume, and again all tests were performed on the separate sets of cells:

1) ten repeated discharge/charge cycles using a 3.9Ω load resistor to an end of discharge voltage of 0.8 Volts, followed by 3 weeks storage at 65C;

2) ten repeated discharge/charge cycles using a 10Ω load resistor to an end of discharge voltage of 0.9 Volts, followed by 3 weeks storage at 65C;

3) one discharge using a 10Ω load resistor to an end of discharge voltage of 0.9 Volts, followed by 3 weeks storage at 65C, followed by three repeated discharge/charge cycles using 10Ω load resistor to an end of discharge voltage of 0.9 Volts;

4) 3 weeks storage at 65C followed by five discharge/charge cycles using a 10Ω load resistor to an end of discharge voltage of 0.9 Volts; and 5) 3 weeks storage at 65C.

Again, at the conclusion of each test, the cells were punctured and the accumulated gas was collected.

No leakage was observed on any of the tests. The gas collected on all tests was determined and the average of the in cell gas is listed in table 3. It is apparent that the various means of hydrogen recombination result in significantly reduced in cell gas volumes.

It should be noted that the amount of catalyst in the coating was 4 to 5 times less than the amount admixed to the cathode blend. The effect is a significant cost saving. Thus, although the maximum gas achieved with the coating is substantially greater than when the HRC is incorporated into the cathode mixture, the gas volumes are still acceptable and the gas reduction is achieved using considerably less catalyst.

EXAMPLE 4

AA size mercury free RAMcells were assembled in the bobbin configuration. The positive electrode composition was as follows:

| | |
|---|---|
| Manganese dioxide | 79% |
| Electrolyte | 6.5% |
| Hydrogen Recombination Catalyst Ag$_2$O | 0.50% |

The mercury free negative electrode had the following composition:

| | |
|---|---|
| Zinc alloy (0.05%Pb) | 56.28% |
| Indium in Coating | 0.06% |
| Surfactant* | .0 to 0.05% |
| Electrolyte and additives | balance |

*The control group 1 contained no surfactant, group 2 contained 0.012% based on gel weight of Polypropyleneglycol (Alkalpol PPG425 supplied by Rhone-Poulenc Canada Inc. of Mississauga, Ontario), group 3 0.025% based on gel weight of Polypropyleneglycol (Alkalpol PPG 425 supplied by Rhone-Poulenc Canada Inc. of Mississauga, Ontario) and group 4 0.050% based on gel weight of Polyethyleneglycol (Alkalpol PEG 600 supplied by Rhone-Poulenc Canada Inc. of Mississauga, Ontario).

The anode gel was processed as described in group 3 of Example 1, except that there was no surfactant added to control group 1, and without any subsequent drying, etc.

The four gels were used in the manufacture of AA RAM cells. A brass nail current collector was used for the negative electrode.

The test cells made were exposed to a variety of electrical and gassing tests, as follows:

1. ten (10) repeated discharge/charge cycles using a 3.9Ω load resistor to an end of discharge voltage of 0.9 volts, followed by 2 weeks storage at 65C, followed by three (3) repeated discharge/charge cycles using a 3.9 load resistor to an end of discharge voltage of 0.9 volts;

2. two (2) weeks storage at 65C;

3. two (2) weeks storage at 65C, followed by five (5) repeated discharge/charge cycles using a 10Ω load resistor to an end of discharge voltage of 0.9 volts;

4. two (2) weeks storage at 65C, followed by ten (10) repeated discharge/charge cycles using a 3.9Ω load resistor to an end of discharge voltage of 0.9 volts;

5. one (1) discharge/charge cycle using a 10Ω load resistor to an end of discharge voltage of 0.9 volts, followed by 2 weeks storage at 65C, followed by five (5) repeated discharge/charge cycles using a 10Ω load resistor to an end of discharge voltage of 0.9 volts;

TABLE 3

Influence of various types of HRC (Hydrogen Recombination Catalyst) and their location on the gas volume of LR06 (international designation equivalent to AA size) mercury free cells after a variety of electrical and high temperature storage tests.

| | Control | Group 1 | Group 2 | Group 3 | Group 4 | Group 5 |
|---|---|---|---|---|---|---|
| HRC Catalyst | None | Ag$_2$O | Ag$_2$O | Ag | Ag | Ti$_2$NiFe |
| HRC Location | N/A | Cathode | Coating | Cathode | Coating | Coating |
| HRC % of Cathode mix | 0 | 0.5% | 0.13% | 0.5% | 0.1% | 0.125% |
| Maximum Gas Volume in a Cell [ml] | 6.00 | 1.70 | 3.60 | 1.60 | 4.30 | 3.70 |
| Gas Volume Reduction [%] | 0 | 72% | 40% | 73% | 28% | 38% |

6. one (1) discharge using a 3.9Ω load resistor to an end of discharge voltage of 0.9 volts, followed by 2 weeks storage at 65°C, followed by a recharge, followed by four (4) repeated discharge/charge cycles using a 3.9Ω load resistor to an end of discharge voltage of 0.9 volts;
7. one (1) discharge/charge cycle using a 3.9Ω load resistor to an end of discharge voltage of 0.9 volts, followed by 2 weeks storage at 65C, followed by four (4) repeated discharge/charge cycles using a 3.9Ω load resistor to an end of discharge voltage of 0.9 volts;
8. one (1) discharge/charge cycle using a 3.9Ω load resistor to an end of discharge voltage of 0.9 volts, followed by one (1) discharge using a 3.9Ω load resistor to an end of discharge voltage of 0.9 volts, followed by 2 weeks storage at 65C, followed by a recharge, followed by three (3) repeated discharge/charge cycles using a 3.9Ω load resistor to an end of discharge voltage of 0.9 volts;
9. two (2) discharge/charge cycle using a 3.9 load resistor to an end of discharge voltage of 0.9 volts, followed by two weeks storage at 65C, followed by three (3) repeated discharge/charge cycles using a 3.9Ω load resistor to an end of discharge voltage of 0.9 volts.

It was noted that the electrical performance of the test cells on the initial discharge, as well as the cumulative discharge capacity over the cycle life of the cells did not vary significantly between the individual test groups.

Again, to determine the gassing performance selected test cells from all groups were collected after the completion of the nine different storage and electrical tests and the cells were punctured and the generated gas collected and measured. The results are displayed in table 4. As noted some of the group 1 cells leaked, so gas collected could not be accurately measured. From these in cell gassing results it is apparent that the use of the organic surfactants significantly improved the gassing performance. The quantity of surfactant was varied depending on the effectiveness of particular surfactants.

not show any bulging or leakage, typical problems associated with hydrogen gas generation in the fully charged, partially discharged and discharged state, and after repeated cycling of rechargeable cells. No bulging or leakage was detected on storage at temperatures as high as 65° C. No signs of dendrite shorts were evident after 100 charge/discharge cycles.

EXAMPLE 5

A further series of experiments for rechargeable and mercury-free AA size cells were conducted. The cell composition and tests were identical in all respects with those described in Example 4 above, except that the surfactants provided in combination with indium sulphate were different from those in Example 4. The surfactants are listed in the following Table 5. All of the surfactants in Table 5 were used in an amount of 0.05% by weight of the negative electrode. The anode gel was processed as for group 3 in Example 1. The amount of indium sulphate was 0.13% of the negative electrode mix.

TABLE 4

Effect of various surfactants on the gas volume of LR06 mercury free cells after a variety of electrical and high temperature storage tests.

| | Group 1 Control | Group 2 This Invention | Group 3 This Invention | Group 4 This Invention |
|---|---|---|---|---|
| Indium based on the neg. electrode weight [%] | 0.06 | 0.06 | 0.06 | 0.06 |
| Surfactant | None | Alkapol PPG 425 | Alkapol PPG 425 | Alkapol PEG 600 |
| Surfactant based on the neg. electrode weight [%] | 0 | 0.012 | 0.025 | 0.050 |
| Average Gas Collected per Cell [ml] | >2.8 | 1.1 | 1.4 | 0.5 |
| Maximum Gas Collected in a Cell [ml] | >20.0 | 4.4 | 4.6 | 4.4 |
| Gas Volume Reduction [%] | 0 | 78 | 77 | 78 |

Sealed rechargeable cells utilizing a mercury free zinc electrode according to the present invention unexpectedly do

TABLE 5

| | | \multicolumn{2}{c}{Gas in mL} | \multicolumn{2}{c}{Reduction} | \multicolumn{2}{c}{Electrical Performance} |
|---|---|---|---|---|---|---|---|

| TRITON | MW | Avg. Gas | Max. Gas | Avg. | Max. | 1st discharge | 10 cyc cumul. |
|---|---|---|---|---|---|---|---|
| \multicolumn{8}{c}{CHEMICAL COMPOSITION: octylphenoxypolyethoxyethanol series} | | | | | | | |
| X-100 | 646 | 1.3 | 2.0 | −63% | −81% | 100% | 100% |
| X-102 | 778 | 1.3 | 2.3 | −63% | −78% | 100% | 100% |
| X-165 | 910 | 1.3 | 2.3 | −63% | −78% | 90% | 95% |
| X-305 | 1526 | 1.3 | 2.0 | −63% | −81% | 85% | 98% |
| X-405 | 1966 | 0.9 | 2.1 | −74% | −80% | 85% | 95% |
| \multicolumn{8}{c}{CHEMICAL COMPOSITION nonylphenoxypolyethoxyethanol series} | | | | | | | |
| N-111 | 704 | 2.1 | 3.9 | −40% | −62% | 95% | 95% |
| X-150 | 880 | 1.2 | 2.5 | −66% | −76% | 93% | 99% |
| \multicolumn{8}{c}{NO SURFACTANT} | | | | | | | |
| 0.1% In to Zn (=0.225% In2(SO$_4$)3) | | 3.5 | 10.3 | | | 95% | 95% |

As shown, the surfactants included octylphenoxypolyethoxyethanol with a molecular weight (MW) varying between 646 to 1966, and identified as Triton X-100 etc., supplied by Canada Colours and Chemicals Brampton, Ontario. The second set of tests used nonylphenoxypolyethoxyethanol as a surfactant with a molecular weight of 704 and 880, and again identified as Triton N-111 and N-150, from the same supplier. For comparison, a test was carried out with no surfactant present. For all tests, indium was provided as 0.13% indium by weight of the zinc powder, equivalent to 0.225% indium sulphate, as indicated.

With reference to the reduction in hydrogen, it can be noted that the first series of tests gives an average reduction varying from 63% to 74%, and a reduction in the maximum gas volume that varies from 78% to 81%, which is fairly uniform for the different surfactants.

The last two columns in Table 5 give the milliampere hours obtained during the first discharge and during 10 discharge/charge cycles. The numbers are expressed as a percentage of the milliampere hours obtained from cells in group 1 with Triton X100. It can be seen from Table 5 that while all surfactants of the octylphenoxypolyethoxy series gave desired reductions of the gas evolved, surfactants X305 and X405 with a molecular weight above 1500 caused a reduction of electrical performance on first discharge by 15%. From these figures, it was determined that the preferred octylphenoxypolyethoxyethanol has a molecular weight in the range of 600–1500.

The nonylphenoxypolyethoxyethanol compounds gave a significant reduction in hydrogen generation and maximum gas generated, but generally were somewhat inferior to the previous compounds.

Finally, for comparison, it can be noted that the presence of indium with no surfactant gives a considerably inferior gas reduction.

EXAMPLE 6

A series of experiments were carried out as described in Example 4, and the cell compositions and tests were as in Example 4, except as detailed below.

The composition of the zinc active powder was varied as shown in Table 6, with the percentages of the lead and indium being by weight of zinc.

Where indicated in Table 6, the zinc active powder was then treated with an aqueous solution of indium sulphate and surfactant here octylphenoxypolyethoxyethanol of a molecular weight 646 (the first surfactant shown in Example 5). The amount of surfactant was 0.05% and the amount of indium sulphate 0.13% of the weight of the negative electrode as defined in Example 1. Again, the indium sulphate and the surfactant were applied without any intermediate or subsequent washing, drying or filtering as described for group 3 in Example 1.

As shown in Table 6 below, one half of the cells made with the zinc powder were not treated with the surfactant or indium sulphate.

All cells in this Example 6 had in the cathode mixture 0.5% Ag$_2$O by weight of the cathode mixture, as a hydrogen recombination catalyst ( HRC ).

The results are set out in the following Table:

TABLE 6

| | | \multicolumn{8}{c}{Various Zinc Powders used with and without filming process} | | | | | | | | |
|---|---|---|---|---|---|---|---|---|---|

| Type | | 1 | 2 | 3 | 4 | 5 | 6 | 7 | 8 |
| | | \multicolumn{2}{c}{Pure zinc} | \multicolumn{2}{c}{Zn-Pb Alloy} | \multicolumn{2}{c}{Zn-In Alloy} | \multicolumn{2}{c}{Zn-Pb-In Alloy} |
|---|---|---|---|---|---|---|---|---|---|
| Alloyed % | % Pb | 0.00% | | 0.05% | | 0.00% | | 0.05% | |
| Alloyed % | % In | 0.00% | | 0.00% | | 0.05% | | 0.05% | |
| In/Surfactant Film | | yes | no | yes | no | yes | no | yes | no |
| HRC | | yes | yes | yes | yes | yes | yes | yes | yes |

TABLE 6-continued

| | | Various Zinc Powders used with and without filming process | | | | | | | |
|---|---|---|---|---|---|---|---|---|---|
| | | 1 | 2 | 3 | 4 | 5 | 6 | 7 | 8 |
| Type | | Pure zinc | | Zn-Pb Alloy | | Zn-In Alloy | | Zn-Pb-In Alloy | |
| Avg. Gas | mL | 0.8 | LEAK | 0.6 | LEAK | 0.3 | 1.2 | 0.8 | 2.1 |
| Max. Gas | mL | 2.1 | LEAK | 2.6 | LEAK | 1.3 | 6.6 | 2.6 | 6.4 |
| Reduction* | % max | −90% | N/A | −87% | N/A | −94% | −67% | −87% | −68% |

*based on 20 mL since some groups leaked and gas escaped

As shown, there are essentially 8 different combinations of the various components. The zinc was provided either as pure zinc; a zinc lead alloy; a zinc indium alloy; or as a zinc, lead and indium alloy. These four possible zinc powders were then provided both with and without the film of indium sulphate and surfactant, and the hydrogen recombination catalyst was provided in all cases.

As the results show, the absence of the film greatly degraded the performance of the cells, and for both the zinc and zinc lead alloy tests, leakage occurred, so that no accurate gas figures could be recorded. Without the film, it was possible to obtain marginally acceptable maximum and average gas figures about 6.5 mL for the zinc-indium and zinc-lead-indium alloy examples.

As shown, the combination of both the indium sulphate/surfactant film and the HRC catalyst provided a synergistic effect giving greatly improved gas figures, for pure zinc and all alloys tested.

We claim:

1. A mercury-free rechargeable cell that performs at least twenty charge and discharge cycles comprising: a cathode; an electrolyte; an anode; and a separator between the anode and the cathode, wherein the anode comprises a zinc active powder that has been coated with a film of one of a surfactant and a solution of a surfactant; and a film of an aqueous, acidic solution of indium sulphate, to retard dendrite growth and hydrogen evolution during at least twenty charge and discharge cycles wherein each of the surfactant and the indium sulphate have been uniformly distributed as a film on the zinc active powder prior to assembly into the rechargeable cell, and wherein the coated zinc active powder is subsequently assembled into the electrochemical cell, without removal of zinc sulphate, and the surfactant, any solvent for the surfactant and the solution of the indium sulphate comprise a minor part the zinc active powder.

2. A cell as claimed in claim 1, wherein the zinc active powder is selected from the group consisting of (1) metallic zinc of 99.98% purity (2) a zinc alloy powder containing at least 99% metallic zinc, and (3) a zinc active powder comprising in the range of up to 20% zinc oxide powder with the balance comprising at least one of metallic zinc powder and zinc alloy powder.

3. A cell as claimed in claim 2, wherein the surfactant is nonionic and the amount of the surfactant is in the range 0.01%–0.25% by weight of the zinc active powder, and the amount of the indium sulphate is in the range of 0.01%–0.25% by weight of the zinc active powder, and wherein the surfactant has a molecular weight in the range 300 to 1500.

4. A cell as claimed in claim 3, wherein the surfactant has a molecular weight in the range 300 to 1500 and is selected from the group consisting of compounds having polyoxypropylene chains and compounds with polyoxyethylene chains and of copolymers thereof.

5. A cell as claimed in claim 4, wherein the surfactant is polypropylene glycol having a molecular weight in the range of 400–800.

6. A cell as claimed in claim 1, wherein the electrolyte comprises an aqueous solution of potassium hydroxide having a concentration in the range of about 25% to 45% and optionally including potassium zincate having a concentration in the range of 0% to 12%.

7. A cell as claimed in claim 6, wherein the anode includes a gelling agent, to form a gelled anode.

8. A cell as claimed in claim 6, wherein the separator includes at least one absorbent layer and at least one semipermeable membrane layer.

9. A cell as in claim 6, wherein the separator consists of a laminate of absorbent layers and barrier layers.

10. A cell as claimed in claim 6, wherein the separator consists of at least one layer of microporous polypropylene.

11. A cell as claimed in claim 6, wherein the anode comprises a pasted anode and includes 4–10% PTFE colloidal suspension and a current collector screen, and wherein the zinc active powder is kneaded with the PTFE colloidal suspension and then rolled on to at least one side of the current collector screen.

12. A cell as claimed in claim 11, wherein the zinc active powder contains zinc oxide powder in the range of 0 to 90%; with the balance comprised of at least one of metallic zinc powder of 99.98% purity and a zinc alloy powder containing at least 99% zinc.

13. A cell as claimed in claim 7 or 11, wherein the electrochemically active material of the cathode includes manganese dioxide.

14. A rechargeable cell as claimed in claim 1, wherein the electrochemically active cathode materials of said cathode are mixed with graphite and potassium hydroxide electrolyte; and wherein the cathode materials include a finely divided hydrogen recombination catalyst comprising at least one of a hydrogen storage alloy, silver, and a silver oxide which are electronically and ionically connected to the electrochemically active materials of said cathode.

15. A cell as claimed in claim 14, wherein the catalyst comprises a hydrogen storage alloy, which comprises an intermetallic alloy which absorbs hydrogen gas and maintains a hydrogen gas pressure below 30 atmospheres.

16. A cell as claimed in claim 14, wherein the catalyst comprises 0.1–5% by weight of the electrochemically active material of the cathode.

17. A cell as claimed in claim 16, wherein at least a portion of the catalyst is provided in an electrically conductive coating on an external surface of the cathode.

18. A cell as claimed in claim 17, which includes an external metallic can, forming a container holding the cathode, anode and electrolyte, wherein the cathode is in contact with an inner surface of the can, and wherein the portion of the catalyst provided in a coating is located on the inner surface of the can, in contact with the cathode.

19. A mercury-free rechargeable cell that performs at least twenty charge and discharge cycles comprising: an anode; a cathode having an electrochemically active powder including an oxide of manganese; a separator including at least one semipermeable membrane layer; an electrolyte solution in the separator, the cathode and the anode, and filling pores thereof, wherein the anode comprises a zinc active powder, and for retarding both zinc dendrite growth and hydrogen evolution during at least twenty charge and discharge cycles, an indium additive and a nonionic surfactant of a molecular weight in the range of 300 to 1500 selected from the group consisting of compounds having polyoxypropylene chains and compounds with polyoxyethylene chains and of copolymers thereof.

20. A cell as claimed in claim 19, wherein the zinc active powder is selected from the group consisting of (1) metallic zinc of 99.98% purity (2) a zinc alloy powder containing at least 99% metallic zinc, and (3) a zinc powder comprising in the range of up to 20% zinc oxide powder with the balance comprising of at least one of metallic zinc powder and zinc alloy powder, and wherein the electrochemically active materials of the cathode are provided by.

21. A cell as claimed in claim 20, wherein said indium additive comprises at least one of an indium compound admixed to the anode mixture, indium coated onto the zinc active powder particles and indium as a minor alloying agent in the zinc alloy powder.

22. A cell as claimed in claim 21, wherein the indium comprises less than 0.25% by weight of the an indium compound.

23. A cell as claimed in claim 21, wherein the surfactant comprises less than 0.25% by weight of the an indium compound.

24. A cell as claimed in claim 23, wherein the electrolyte comprises potassium hydroxide.

25. A mercury-free rechargeable cell, that perform at least twenty charge and discharge cycles, the cell comprising: a cathode; an electrolyte; an anode including zinc as an electrochemically active material; and a coating, including a hydrogen recombination catalyst, provided on an external surface of the cathode.

26. A cell as claimed in claim 25, wherein the hydrogen recombination catalyst is selected from the group consisting of a hydrogen storage alloy, silver and silver oxide, present as a finely divided powder.

27. A cell as claimed in claim 25, which includes an external metallic can, forming a container for the cell, where the cathode is in contact with a surface of the can, and wherein the coating is provided on an inner surface of the can, and in contact with the cathode.

28. A cell as claimed in claim 27, wherein the catalyst comprises a hydrogen storage alloy, which comprises an intermetallic alloy which absorbs hydrogen gas and maintains a hydrogen gas pressure below 30 atmospheres.

29. A cell as claimed in claim 28, wherein the cathode includes oxides of manganese as the active material, and the cathode contains at least one of: barium sulphate in the range of 3–15% by weight of the cathode; and a hydrophobic additive in the range of 0.1 to 10% by weight of the cathode active material, which hydrophobic additive comprises at least one of polytetrafluoroethylene, polyethylene, polypropylene, and metal stearate.

30. A method of manufacturing a mercury-free zinc anode for use in a mercury-free rechargeable electrochemical cell that performs at least twenty charge and discharge cycles, the method comprising the steps of:
(a) coating dry mercury free zinc active powder with one of a film of an organic surfactant and a film of a solution of an organic surfactant;
(b) coating the mercury-free zinc active powder with a film of an aqueous, acidic solution of indium sulphate, the amounts of the surfactant and the indium sulphate solution being determined to leave the zinc free flowing; and
(c) processing the coated zinc active powder into an anode, without removal of zinc sulphate.

31. A method as claimed in claim 30, wherein the zinc active powder is selected from the group consisting of (1) metallic zinc of 99.98% purity, (2) a zinc alloy powder containing at least 99% metallic zinc, and (3) a zinc powder comprising in the range of up to 20% zinc oxide powder with the balance comprising of at least one of metallic zinc powder and zinc alloy powder.

32. A method as claimed in claim 31, wherein the zinc active powder is coated with a film of an organic surfactant in step (a) and wherein the amount of the surfactant is in the range 0.01%–0.25% by weight of the zinc active powder, and wherein in step (b) the amount of the indium sulphate is in the range of 0.01%–0.025% by weight of the zinc active powder.

33. A method as claimed in claim 32, wherein the zinc active powder is coated in step (b) with a surfactant having a molecular weight in the range of 300–1500.

34. A method as claimed in claim 32, wherein the surfactant is provided as an aqueous solution.

35. A method as claimed in claim 31, wherein the aqueous solution of indium sulphate has a pH between 1 and 2.

36. A method as claimed in claim 31, wherein the surfactant is added to the zinc active powder, and the acidic indium sulphate solution is subsequently added to the zinc active powder.

37. A method as claimed in claim 30, wherein the zinc active powder is placed in a liquid to solid blender, the surfactant and the acidic indium sulphate solution are sprayed onto the zinc powder, while the powder is tumbled in the blender to achieve a uniform coating of the zinc powder particles by the film of the surfactant and the indium sulphate solution.

38. A method as claimed in claim 30, where step (c) comprises: adding a gelling agent and an aqueous solution of potassium hydroxide to form a gelled anode mixture.

39. A method as claimed in claim 38, when carried out in a liquid to solid blender, wherein steps (a) and (b), and step (c) are all carried out in the liquid to solid blender, with blending and tumbling of the zinc active powder being carried out continuously through steps (a), (b) and (c).

40. A method as claimed in claim 38, wherein the aqueous solution of potassium hydroxide contains dissolved in it zinc oxide up to saturation.

41. A method of assembling an electrochemical cell, the method comprising the steps of:
(a) coating dry mercury free zinc active powder with one of a film of an organic surfactant and a film of a solution of an organic surfactant;
(b) coating the mercury free zinc active powder with a film of an acidic solution of indium sulphate, the amounts of the surfactant and the indium sulphate solution being determined to leave the zinc free flowing;
(c) processing the coated zinc active powder into an anode without removal of zinc sulphate;
(d) providing an external container defining the electrochemical cell;
(e) providing a cathode in the container;
(f) providing a separator between the cathode and the anode;
(g) assembling the zinc active powder as part of the anode in the container;

(h) providing an electrolyte for the cell in the container.

42. A method as claimed in claim 41, wherein the external container comprises a metallic can, wherein the cathode is provided in contact with the metallic can.

43. A method as claimed in claim 41 or 42, wherein the electrolyte comprises an aqueous solution of potassium hydroxide having a concentration in the range of about 25% to 45% and optionally including potassium zincate having a concentration in the range of 0% to 12%.

44. A method as claimed in claim 41, wherein the cathode active material comprises at least one of manganese dioxide, manganese oxyhydroxide and bismuth modified manganese oxide, and the cathode materials are provided in the form of hollow cylindrical pellets.

45. A method as claimed in claim 44, wherein a hydrogen recombination catalyst is provided in the cell by a method selected from the following group:

(1) mixing the hydrogen recombination catalyst with the cathode materials;

(2) providing the hydrogen recombination catalyst on the interior of the container; and (3) providing the hydrogen recombination catalyst at the interface between the cathode materials and the separator.

* * * * *